United States Patent Office 2,739,598
Patented Mar. 27, 1956

2,739,598

FILTER FOR TOBACCO SMOKE

Frederick R. Eirich, Tuckahoe, N. Y., assignor to R. S. Aries and Associates, Inc., New York, N. Y., a corporation of New York No Drawing. Application May 4, 1953,
Serial No. 352,977

6 Claims. (Cl. 131—10)

This invention relates to the purification of tobacco smoke, and particularly to a new filter material for removing the undesirable constituents of tobacco smoke and the method for its preparation.

It is known to provide holders for cigars and cigarettes, pipes and even the mouthpieces of cigarettes with filters for the purpose of removing several biologically active substances from tobacco smoke. These filter media have been made of materials such as absorbent cotton, crepe or corrugated paper, silica gel, and the like, and what purification was effected occurred through the mechanical filtration of smoke particles of the order of magnitude of 1 micron in size, or through the surface phenomenon of physical adsorption. Nonetheless, a substantial proportion of the biologically active components penetrated the filters and entered the mouth and throat of the smoker causing unnecessary irritation and physiological reaction.

It is therefore an object of this invention to provide means for removal of materials from tobacco smoke which separate substances therefrom such as nicotine, acids, tars, resins, and the like, by chemical action.

It is a further object of this invention to provide filter means for removal of undesirable materials from tobacco smoke by a combination of chemical, physical, and mechanical action, while permitting the passage of the tasteful components.

Another object of this invention is to provide a filter unit which may be incorporated at one end of a cigarette or which may be used separately in pipes and holders for cigarettes and cigars and which will remove substances such as nicotine, acids, tars, and resins by chemical, physical, and mechanical action.

It is yet a further object of this invention to outline processes for preparing the novel filter means of this invention.

Additional objects will become apparent from the detailed description of the invention which follows.

It has now been discovered that ion exchange materials have the ability to remove undesired constituents of tobacco smoke present in both the liquid and vapor states. Cation exchangers will remove basic constituents such as nicotine through chemical reaction and addition. Anion exchangers will similarly react with acidic components such as resins and will prevent them from entering the mouth of the smoker by chemically rendering them immobile and non-volatile.

This invention permits purification of such tobacco smoke by chemical reaction in addition to purification by mechanical filtration or physical adsorption. In mechanical filtration some particles of solid entrained in the smoke are too large to pass through the interstices of the filter and are retained on the influent side. Through physical adsorption, a surface will remove some portion of a fluid from a fluid stream passing over it and the amount will depend on the size and nature of the surface and the time of contact. The use of ion exchangers effects chemical purification by binding fluid ingredients through a stoichiometric reaction between the functional groups of the exchanger and the undesirable components of the fluid.

With regard to the chemical nature of the ion exchange materials used in these filters, particularly advantageous results accrue from the presence of hydrophilic groups which bind a minute amount of water uniformly throughout the material. Where the ion exchange materials do not possess sufficient hydrophilic groups, and even where they do, additional moisture retaining agents, humectants such as glycerol, sorbitol, and the like, may be employed in admixture with the ion exchangers. Water so adsorbed or retained has little or no fluidity and is subject to only small fluctuations in amount due to changes in the prevailing relative humidity. This water can be removed only by extreme treatments and at the same time it does not render the material soggy or moist or otherwise unsuited for the purposes of this invention. Organic groups such as the carboxylic acid, the hydroxyl, and several other oxygen containing functional groups are known to be hydrophilic, and ion exchange materials prepared from components possessing these functional groups produce especially beneficial results. Accordingly, polymers or copolymers of one or more of the following compounds are preferred filter components: acrylic acid, methacrylic acid, crotonic acid, maleic acid, fumaric acid, vinyl phosphonic acid, vinyl sulfonic acid, uronic acids, polyuronic acids, polyamino acids, vinyl pyrrolidone, and the like. Esters of these materials may be employed instead and the resulting polymers can be subjected to hydrolysis to liberate the acid and hydroxyl radicals.

The following example of the practice of this invention is included for purposes of illustration rather than limitation:

*Example*

An aqueous suspension of methyl acrylate and vinyl pyrrolidone is prepared and after the addition of benzoyl peroxide as polymerization catalyst the temperature is brought to 60° C. and maintained there. The copolymerization is terminated when a substantial proportion attains an average molecular weight between 50,000 and 500,000. The copolymer is separated from the reaction mass, resuspended in water, and mixed with a stock of paper pulp and ground wood prior to introduction of the stock into the wet end of a paper machine. The copolymer is virtually completely taken up by the stock and exists as a very thin layer covering the individual fibers. The impregnated paper which leaves the machine removes bases such as ammonia, methylamine, aniline, pyridine, and nicotine directly from tobacco smoke.

Other carriers such as charcoal, silica and alumina gels, sawdust, and shredded pulp may be used in place of the paper shown in the example. The absorbent cotton plugs presently used as filters on some brands of cigarettes may likewise be dipped in an ion exchanger suspension and dried, and then used in conventional manner.

Wide variations in the composition of the ion exchangers and the methods of using them are possible with substantially the same end results. In place of the exchangers described in the example, others such as the zeolites and natural or synthetic exchangers of inorganic or organic nature may be utilized with similar effectiveness. Any anion or cation exchanger may be used separately or in combination for reaction with the materials sought to be removed from the smoke. Since different resins have different affinities for each of the undesired materials, the choice of any particular resin or resins will depend upon the nature and composition of the tobacco.

Suitable blends of ion exchange materials can readily be prepared which will remove the undesirable components from the smoke of practically all of the commercially available tobaccos. For those smokers who may prefer a less efficient filter, lesser amount of the ion exchange materials may be utilized in the impregnation. Where similar results are desired with filters of the solid, rigid foam type, greater amounts of foaming agent may be employed in formation of the filter resulting in a decreased density. With but a slight decrease in efficiency through the use of less filter material there will be a significant increase in the ease with which smoke may be inhaled through the filter.

Where the ion exchange materials are in the form of a continuous mass, as for example a foam, no carrier is necessary. However, for ease of replacement it can be enclosed within a carrier to form a filter unit or insert which will retain the unwanted residues inside thereby facilitating removal and substitution. Where the filter materials are in the form of discrete particles they may be utilized in similar manner as a mass enclosed within a carrier, constituting for example a tubular cartridge which will fit existing holders, or they may be deposited on or impregnated throughout the carrier as a base material. The use of fine particles increases the available surface of the ion exchange materials and is therefore preferred. While larger particles may be pulverized for this purpose, the fines resulting from the manufacture of synthetic resins are particularly suited for the instant purposes, and since they are ordinarily unsuited for other commercial applications, their use represents an additional economy. The carrier may be inert with regard to the application of the invention or preferably it, too, will be a filter material. Suitable carriers for the practice of this invention are charcoal, silica and alumina gels, sawdust, paper, shredded pulp, various carbohydric materials, and the like. The absorbent cotton plugs presently used as filters on some brands of cigarettes may likewise be dipped in an ion exchanger suspension and dried, and then used in conventional manner.

The entire filter unit need only be placed in the path of the smoke to operate and in cigarettes this is desirably effected by making the ion exchange filter an integral part of the cigarette by enclosing it within the same wrapper as the tobacco, at the mouthpiece end. It will, of course, be disposed of along with the unsmoked portion of the cigarette. For use in holders and pipes, however, the unit is preferably removable and it may be used many times before being replaced by a fresh cartridge.

The nature of the invention is such as to be capable of various changes and modifications without departing from the spirit and scope thereof. Insofar as these changes and modifications are obvious to those skilled in the art, they are to be considered as part of this invention and are to be covered by the annexed claims.

I claim:

1. As a new article of manufacture, a cigarette having incorporated at one end a filter for the smoke comprising a porous network containing spaced, dry particles of a water-insoluble ion exchange material selected from the group consisting of a copolymer of methyl acrylate and vinyl pyrrolidone, and a hydrolyzed copolymer of methyl acrylate, glycol dimethacrylate and vinyl acetate.

2. As a new article of manufacture, a cigarette having incorporated at one end a filter for the smoke comprising a carrier impregnated with a water-insoluble copolymer of methyl acrylate and vinyl pyrrolidone.

3. The process for the purification of tobacco smoke of a smoking article which comprises passing said smoke through a filter comprising a porous network containing spaced, dry particles of a water-insoluble ion exchange material selected from the group consisting of a copolymer of methyl acrylate and vinyl pyrrolidone, and a hydrolyzed copolymer of methyl acrylate, glycol dimethacrylate and vinyl acetate.

4. The process according to claim 3, wherein said filter contains both an anion exchange material and a cation exchange material.

5. The process for the purification of tobacco smoke of a smoking article which comprises passing said smoke through a filter comprising a carrier impregnated with a water-insoluble copolymer of methyl acrylate and vinyl pyrrolidone.

6. The process according to claim 5, wherein said copolymer has an average molecular weight between about 50,000 and 500,000.

References Cited in the file of this patent

UNITED STATES PATENTS

| | | |
|---|---|---|
| 2,340,111 | D'Alelio | Jan. 25, 1944 |
| 2,497,705 | Werntz | Feb. 14, 1950 |
| 2,525,497 | Monfried | Oct. 10, 1950 |
| 2,597,437 | Bondamer | May 20, 1952 |
| 2,636,851 | Juda et al. | Apr. 28, 1953 |
| 2,707,959 | Shelanski | May 10, 1955 |

FOREIGN PATENTS

| | | |
|---|---|---|
| 264,287 | Switzerland | Jan. 3, 1950 |
| 497,708 | Great Britain | Dec. 19, 1937 |
| 501,402 | Belgium | Mar. 15, 1951 |